Dec. 6, 1955 G. W. HOLLIS 2,725,811
CULTIVATOR ATTACHMENTS FOR TRACTORS
Filed Jan. 25, 1952 2 Sheets-Sheet 1

INVENTOR.
Grady W. Hollis

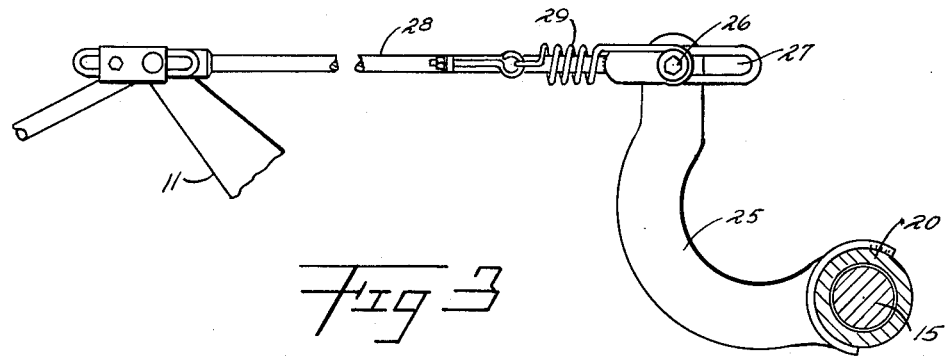
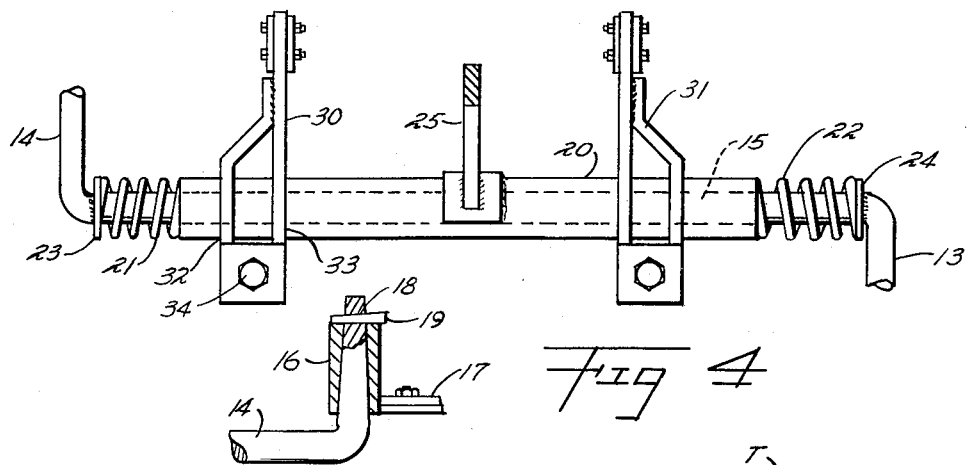
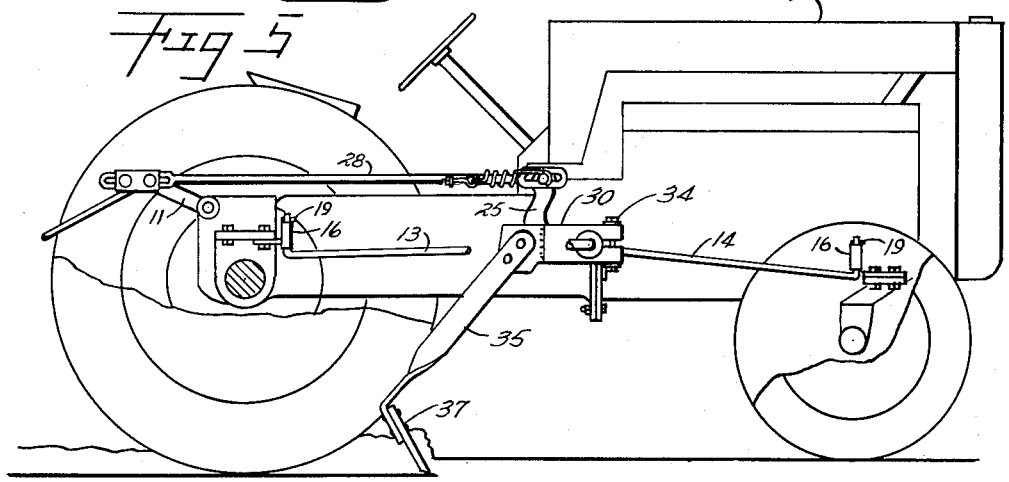

United States Patent Office 2,725,811
Patented Dec. 6, 1955

2,725,811

CULTIVATOR ATTACHMENTS FOR TRACTORS

Grady W. Hollis, Lillie, La.

Application January 25, 1952, Serial No. 268,193

2 Claims. (Cl. 97—47.41)

The present invention relates to agricultural cultivator attachments for tractors and more especially directed to a simple and unique attachment advantageously used in the cultivation of row crops.

Many efforts have been directed to the provision of various cultivator attachments for operation with tractors, which prior art devices have been mainly characterized by complexities of arrangement as well as inconvenience in mounting. While certain agricultural operations necessitate heavy and complex equipment, it is generally understood that two or more men will be needed to mount and demount the device to the tractor. It is not only annoying to the operator, but consumes considerable time if a heavy attachment must be changed in a field or tract far removed from the barn or warehouse where the tools and supplies are kept. Manufacturers of equipment have made considerable advancement in recent years in that attachments now being made are constructed as simple as possible with the fewest number of moving parts. Moreover, every thought has been put to the possibility of the attachment being mounted to the tractor with only a few simple mounting points so that the entire assembly may be handled by a single operator and the attachments mounted with the simplest of tools.

It is an object, therefore, of the present invention to provide a row-crop cultivator attachment for tractors which is suspended from the tractor at only two points.

A further object of the invention is to provide such an attachment which may be used on either or both sides of a tractor for single or two-row cultivation.

Another object of the invention is to provide a row-crop cultivator which utilizes the hydraulic lift mechanism of the tractor for plow penetration into the soil.

Another object of the invention is the provision of a cushioning effect to the attachment both transversely and longitudinally in the direction of the tractor's movement. This cushioning effect is accomplished by means of springs which permit the plows a limited movement in two planes so that if they strike a stone, stump or other object, there will be less likelihood of damage had not such provision been made.

Another object of the invention is to provide a simple attachment with a minimum number of component parts and yet which is provided with every adjustment necessary for the cultivating operation.

Other objects and advantages of the invention will become apparent in the course of the following detailed description when viewed together with the accompanying drawing in which:

Fig. 3 is a detail view illustrating the manner of employing the use of the tractor's hydraulic lift for depth penetration of the plows.

Fig. 4 is a detail top view illustrating the manner of mounting the plows to the attachment.

Fig. 5 is a broken detail view illustrating the mode of suspension used in mounting the attachment to the tractor.

Fig. 6 is a broken, side view showing my invention in use as a cultivator.

Figure 1:
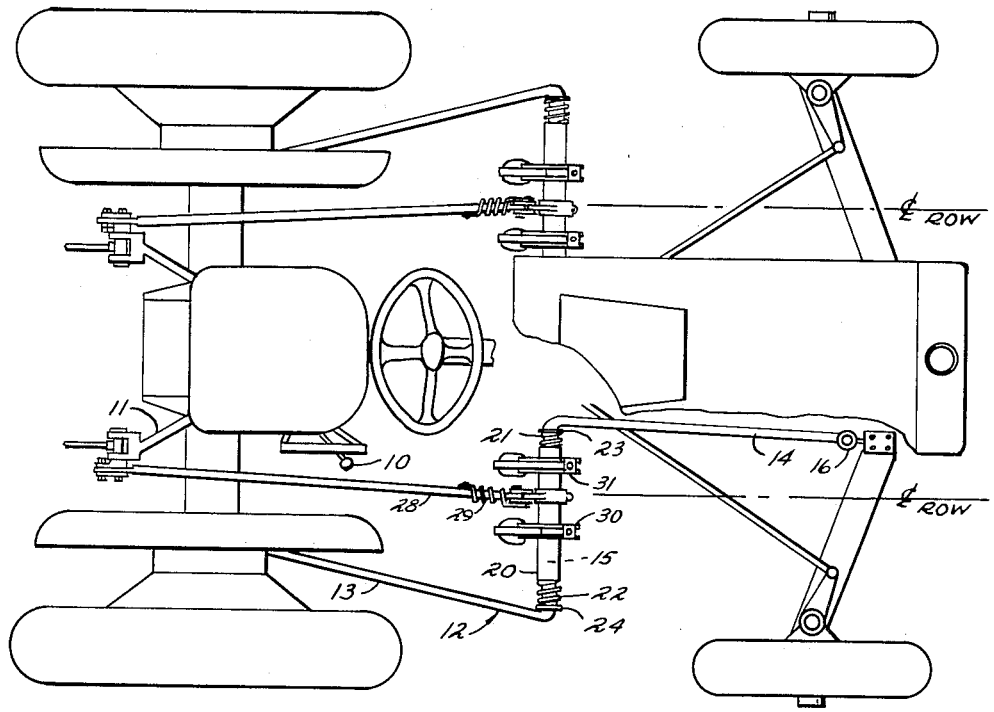
Fig. 1 is a top view of a conventional tractor showing an embodiment of my invention in a cultivator attached to the same.

In the drawing the letter T designates the tractor, which is provided with a hydraulic lift mechanism having a control lever 10 and the conventional, rearwardly projecting lift arms 11. My attachment consists of a main frame designated generally by the numeral 12. As seen by the drawing, the frame is made substantially Z- or S-shaped with two legs 13 and 14 lying substantially parallel to the longitudinal axis of the tractor and one leg 15 in a transverse plane with the tractor. In the present instance the frame 12 is made of a length of round rod bent in the shape described and having the ends thereof bent upon themselves in the manner illustrated in Fig. 5. These extreme ends are tapered before bending with a taper corresponding to a tapered hole machined into a mounting socket 16. The socket 16, in turn, is welded to a plate 17 which is held to the axles of the tractor by means of conventional bolts and nuts. Both front and rear sockets are made to stand vertically so that the tapered ends of the main frame may be inserted into their respective socket holes from the bottom side. At the upper end of each of the tapered portions of the main frame 12 I have formed receiving holes 18 suitable for receiving wedging keys 19, with the very extreme ends of the tapered portions extending upwardly beyond the upper limit of its respective socket. Thus, when the tapered ends are forced upwardly into their sockets in mounting, they are held temporarily until the wedged keys 19 can be tapped into a locking position. As the wedging key becomes wedged into position, it also wedges the tapered ends of the frame tightly into the holes to secure the frame ends against movement in any direction. To remove the frame, an operator simply taps the wedging key out and taps the upper, projecting ends of the frame downwardly. As soon as the wedging action of the tapers is broken, the entire frame will fall to the ground.

Along the transverse leg 15 of the frame 12, I have placed an outer sleeve 20 having an inside diameter of such dimension as to snugly fit around the main frame leg 15 and yet be movable both radially and longitudinally thereon.

As seen by the drawing this sleeve 20 is interposed between two compression springs 21 and 22 held in slight initial compression by means of washers 23 and 24 which are tack-welded to the leg 15.

Centrally disposed along this sleeve 20 I have provided a rocker arm 25 made in the shape as shown in Fig. 3, having its inner end welded or otherwise affixed to the sleeve 20 and its outer end prepared for actuation by the hydraulic control of the tractor. In the present instance, the outer end of the arm 25 is provided with a transversely positioned stationary stud 26. The stud is positioned through an elongated slot 27 in the forward end of the actuating rod 28. The rear end of this rod 28 is affixed to one of the lift arms 11 of the tractor much in the same manner as the forward end of the rod so that maximum adjustment might be obtained. The forward stud 26 is not tightened against the sides of its slot 27 but is made slightly smaller in diameter than the width of the slot in order that the rod 28 might slide freely thereon.

Encircling the rod 28 is a tension spring 29 having the rear end thereof affixed to the rod and the forward end looped over the outer projecting end of the stud 26.

Now it can be seen that any movement in the up and down planes of the lifting arms 11 of the tractor by actuation of the hydraulic control mechanism, a corresponding rotative movement is imparted to the sleeve 20.

Also spaced along this outer sleeve 20 are plow hangers 30 and 31. Each of the plow hangers consist of a pair of steel plates 32 and 33 split part of the way through from the forward end and squeezed around the sleeve 20 by means of clamping bolts 33 and 34. Thus the plow hangers may be adjusted radially around the sleeve in any position or spaced longitudinally according to a desired row width.

The plow arms 35 and 36 are bolted to their respective hangers 31 and 32 and depend downwardly and rearwardly. Plow points 37 and 38 are removably mounted to the plow arms 35 and 36.

While I have described only a single frame mounted at one side of the tractor T, it will be understood that the other frame on the opposite side of the tractor as shown in the drawing will be affixed for operation in the same manner as that just described, the two frames constituting a right and a left hand frame for the complete pair.

Figure 2:
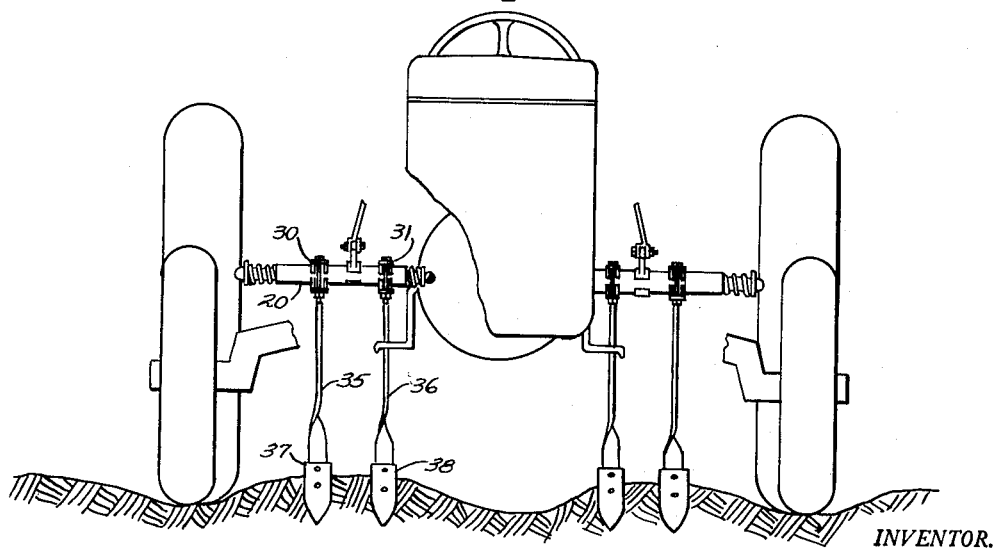
Fig. 2 is a broken, front view of the device shown in Fig. 1 and illustrating the manner of adjusting the cultivator plows to the row width.

Now let it be assumed that a device made in accordance with the teachings of the present invention is attached to a tractor and set up for operation as shown in the drawings. According to Fig. 2 the hangers 30 and 31 may be adjusted longitudinally along the sleeve 20 to move the actual plow points 37 and 38 toward or away from the plants in the row. By actuation of the hydraulic lift mechanism a forward and rear movement of the actuating rod is obtained to rotate the sleeve 20 and thus set the plow points to any plowing depth desired.

It will be remembered that these cultivating points are relatively small and are intended only to loosen the soil immediately adjacent the growing plants. It will be readily seen, therefore, that if they strike a root or other object in their direction of travel, there is likelihood of damage unless some flexibility is provided. In Fig. 3 it will be noted that while the greater portion of the thrust against the plow points is taken by the cross member 15, there is also a tortional force tending to lengthen the tension spring 29. These forces are so balanced, however, that only an unusual or excessive force against the plow points will rotate the sleeve 20, thus allowing the plow points to lift upwardly over the obstruction and fall back into their former position by means of the spring 29.

Moreover, it will be noted that the actual thrust against the plow points occurs at quite a distance to the rear of a vertical line taken through the sleeve and leg 15; hence any excessive thrust will not tend to bend the frame upwardly but will become a tortional force acting against the tension spring 29.

The same flexibility described above might also apply in the transverse movement of the plows. This is accomplished by means of the compression springs 21 and 22 provided at each end of the sleeve 20. Since the sleeve 20 is mounted loosely upon the leg 15, it is readily seen that the sleeve is permitted to move in first one direction and then the other according to the side thrust put upon it by the plow points. Since the outer ends of the springs are made stationary, the sleeve will immediately return to a central position.

While I have described my invention in detail in a particular embodiment, it is to be understood that this has been by way of example only, the bends at the ends of the transverse leg 15 could be replaced by some removable, yet rigid joint or the sleeve 20 could be made extra long so as to accommodate several hangers and plows. Other changes could also be made without departing from the spirit and scope of the invention as defined by the following claims.

I claim:

1. A cultivator attachment for tractors provided with a hydraulic lift mechanism comprising a unitary main frame structure consisting in a rod bent in a substantially S-shape, the ends of said rod being turned upwardly and provided with conically tapered tips, a mounting bracket affixed to the front and rear of said tractor, each of said brackets including a socket provided with a tapered bore corresponding to the taper provided on the tips of said main frame, each of said brackets adapted to receive the ends of said frame and to support the same against movement in any plane, means for locking said main frame tips in their respective sockets, plow arms and plows on said frame, means cooperating with the hydraulic lift of said tractor for setting the plowing depth of said plows and means for mounting said plows to said frame in a manner to yield to an excessive force against them both transversely and in the longitudinal direction of plowing.

2. In a cultivator attachment for tractors, a main frame consisting in a single rod bent upon itself to form a forward longitudinal arm, an intermediate transverse arm extending from the rear end of the said forward arm, and a rear longitudinal arm extending from the other end of said intermediate arm, said arms being substantially coplanar, the ends of the forward and rear arms being turned at right angles and provided with conical tips, mounting brackets for said frame affixed to the forward and rear ends of said tractor, said brackets including a tapered bore adapted for receiving the corresponding conically shaped tips of said main frame, a tubular sleeve mounted upon said intermediate arm for both longitudinal and rotative movements, compression springs on said intermediate arm normally urging said sleeve into a centrally disposed position along said intermediate arm, plow hangers adjustably mounted for rotative and longitudinal movements along said sleeve, a rocker arm affixed to said sleeve, means for rotating said sleeve to raise and lower said plows and means on said rocker arm permitting a yieldable movement upward of said plows against an abnormal force against the same.

References Cited in the file of this patent

UNITED STATES PATENTS

| | | |
|---|---|---|
| 1,696,299 | Green | Dec. 25, 1928 |
| 2,359,206 | Currie | Sept. 26, 1944 |